(12) United States Patent
Oh et al.

(10) Patent No.: US 12,327,893 B2
(45) Date of Patent: Jun. 10, 2025

(54) HUMIDIFIER FOR FUEL CELL

(71) Applicant: KOLON INDUSTRIES, INC., Seoul (KR)

(72) Inventors: Youngseok Oh, Seoul (KR); Ahreum Lee, Seoul (KR); Jiyoon Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 363 days.

(21) Appl. No.: 17/996,342

(22) PCT Filed: Jun. 23, 2021

(86) PCT No.: PCT/KR2021/007852
§ 371 (c)(1),
(2) Date: Oct. 15, 2022

(87) PCT Pub. No.: WO2022/005089
PCT Pub. Date: Jan. 6, 2022

(65) Prior Publication Data
US 2023/0197986 A1     Jun. 22, 2023

(30) Foreign Application Priority Data
Jul. 2, 2020   (KR) .......................... 10-2020-0081638

(51) Int. Cl.
*H01M 8/04119*   (2016.01)
(52) U.S. Cl.
CPC ................. *H01M 8/04126* (2013.01)
(58) Field of Classification Search
CPC .......... H01M 8/04126; H01M 8/04149; Y02E 60/50
See application file for complete search history.

(56) References Cited

U.S. PATENT DOCUMENTS

2001/0009306 A1*  7/2001  Shimanuki ......... H01M 8/04119
                                                              261/107
2001/0015501 A1*  8/2001  Katagiri ............ H01M 8/04126
                                                              261/154
(Continued)

FOREIGN PATENT DOCUMENTS

JP           55116813 A   *  3/1979  ............... D01F 2/04
JP         S55-116813 A      9/1980
(Continued)

OTHER PUBLICATIONS

The office action dated Jun. 14, 2024 related to the corresponding Korean Patent application.
(Continued)

*Primary Examiner* — Kaity V Chandler
(74) *Attorney, Agent, or Firm* — Harvest IP Law, LLP

(57) ABSTRACT

The present invention relates to a humidifier for a fuel cell, the humidifier comprising: a humidification module for humidifying dry gas supplied from the outside by using wet gas discharged from a fuel cell stack; a mid-case including a first cap coupled to one end of the humidification module and a second cap coupled to the other end of the humidification module, both ends of the humidification module being open; a first gas inlet and a first gas outlet formed on one side of the mid-case; and a hollow fiber membrane bundle accommodated inside the mid-case along the lengthwise direction, wherein the hollow fiber membrane bundle includes a plurality of first hollow fiber membranes, the first hollow fiber membranes each independently include a first hollow, and the center of each of the first hollows is offset toward the other side of the mid-case with respect to the center of each of the first hollow fiber membranes.

10 Claims, 7 Drawing Sheets

(56) References Cited

U.S. PATENT DOCUMENTS

| | | | | |
|---|---|---|---|---|
| 2005/0271920 | A1* | 12/2005 | Eshraghi | H01M 8/1011 |
| | | | | 429/535 |
| 2008/0237902 | A1* | 10/2008 | Nagumo | B01D 53/22 |
| | | | | 261/104 |
| 2011/0127683 | A1* | 6/2011 | Kim | H01M 8/04141 |
| | | | | 261/DIG. 65 |
| 2012/0111967 | A1* | 5/2012 | Katagiri | B01D 63/033 |
| | | | | 239/34 |
| 2015/0364779 | A1* | 12/2015 | Noh | H01M 8/04149 |
| | | | | 429/413 |

FOREIGN PATENT DOCUMENTS

| | | | | | |
|---|---|---|---|---|---|
| JP | 2002303435 A | * | 10/2002 | | Y02E 60/50 |
| JP | 2004-209418 A | | 7/2004 | | |
| JP | 2005098695 A | * | 4/2005 | | B01F 3/04007 |
| JP | 2007046801 A | * | 2/2007 | | H01M 8/04141 |
| JP | 2015-029927 A | | 2/2015 | | |
| KR | 20080077598 A | | 8/2008 | | |
| KR | 20110060048 A | | 6/2011 | | |
| KR | 20140038223 A | | 3/2014 | | |
| KR | 20140099753 A | | 8/2014 | | |
| KR | 101535026 | * | 7/2015 | | H01M 8/04492 |
| KR | 101535026 B1 | | 7/2015 | | |
| KR | 20190055635 A | | 5/2019 | | |
| KR | 20190139656 A | | 12/2019 | | |
| WO | WO-2004028671 A1 | * | 4/2004 | | B01D 53/22 |
| WO | 2019/132141 A1 | | 7/2019 | | |

OTHER PUBLICATIONS

The office action dated Oct. 24, 2023 related to the corresponding Japanese Patent application.

The office action dated Nov. 27, 2024 related to the corresponding Canadian Patent application.

* cited by examiner

HUMIDIFIER FOR FUEL CELL

CROSS REFERENCE TO RELATED APPLICATIONS

This application is a National Stage of International Application No. PCT/KR2021/007852 filed Jun. 23, 2021, claiming priority based on Korean Patent Application No. 10-2020-0081638 filed Jul. 2, 2020, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier. [9] When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells, and FIG. 2 is a schematic sectional view of a conventional hollow fiber membrane.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method. The fixing layers 113, in which ends of the hollow fiber membranes 112 are potted, and resin layers 114 provided between the fixing layers 113 and the mid-case 111 isolate inner spaces of the caps 120 from an inner space of the mid-case 111. Similarly to the fixing layers 113, each of the resin layers 114 is generally formed by hardening a liquid polymer, such as liquid polyurethane resin, using a casting method.

Air supplied from the outside flows along hollows of the hollow fiber membranes 112. Off-gas introduced into the mid-case 111 through the off-gas inlet 111a comes into contact with the outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollows of the hollow fiber membranes 112.

Here, as shown in FIG. 2, each of the hollow fiber membranes 112 is configured such that the hollow thereof is formed at the center thereof, whereby a membrane thickness 112b is overall uniform. The membrane thickness 112b means the length between an inner surface 112c of the hollow fiber membrane 112 and an outer surface 112d of the hollow fiber membrane 112. If the membrane thickness 112b of each of the hollow fiber membranes 112 is too large, humidification performance using the hollow fiber membranes 112 is lowered. If the membrane thickness 112b of each of the hollow fiber membranes 112 is too small, on the other hand, the hollow fiber membranes 112 are partially damaged or broken by the pressure of off-gas introduced into the mid-case 111.

DISCLOSURE

Technical Problem

The present disclosure has been made in view of the above problems, and it is an object of the present disclosure to provide a humidifier for fuel cells capable of securing both humidification performance using hollow fiber membranes and durability of the hollow fiber membranes.

Technical Solution

In order to accomplish the above object, the present disclosure may include the following construction.

A humidifier for fuel cells according to the present disclosure may include a humidifying module configured to humidify dry gas supplied from outside using wet gas discharged from a fuel cell stack, a first cap coupled to one end of the humidifying module, and a second cap coupled to the other end of the humidifying module.

In the humidifier for fuel cells according to the present disclosure, the humidifying module may include a mid-case open at opposite ends thereof, a first gas inlet and a first gas outlet formed at one side of the mid-case, and a hollow fiber membrane bundle received in the mid-case in a longitudinal direction. The hollow fiber membrane bundle may include a plurality of first hollow fiber membranes. Each of the first hollow fiber membranes may independently include a first hollow. The center of the first hollow may deviate from the center of the first hollow fiber membrane toward the other side of the mid-case.

In the humidifier for fuel cells according to the present disclosure, the humidifying module may include a mid-case open at opposite ends thereof, a first gas inlet and a first gas outlet formed at one side of the mid-case, and at least one cartridge disposed in the mid-case. The cartridge may include an inner case having an opening formed at each end thereof, a hollow fiber membrane bundle being received in the inner case. The inner case may be provided at one side thereof with a second gas inlet and a second gas outlet. The hollow fiber membrane bundle may include a plurality of first hollow fiber membranes. Each of the first hollow fiber membranes may independently include a first hollow.

The center of the first hollow may deviate from the center of the first hollow fiber membrane toward the other side of the inner case.

Advantageous Effects

According to the present disclosure, it is possible to achieve the following effects.

The present disclosure is implemented such that both humidification performance and durability are secured using a hollow fiber membrane having an eccentric hollow. In the present disclosure, therefore, it is possible to reduce damage to or breakage of hollow fiber membranes due to the pressure of gas and to exhibit improved humidification performance.

BEST MODE

Figure 6:
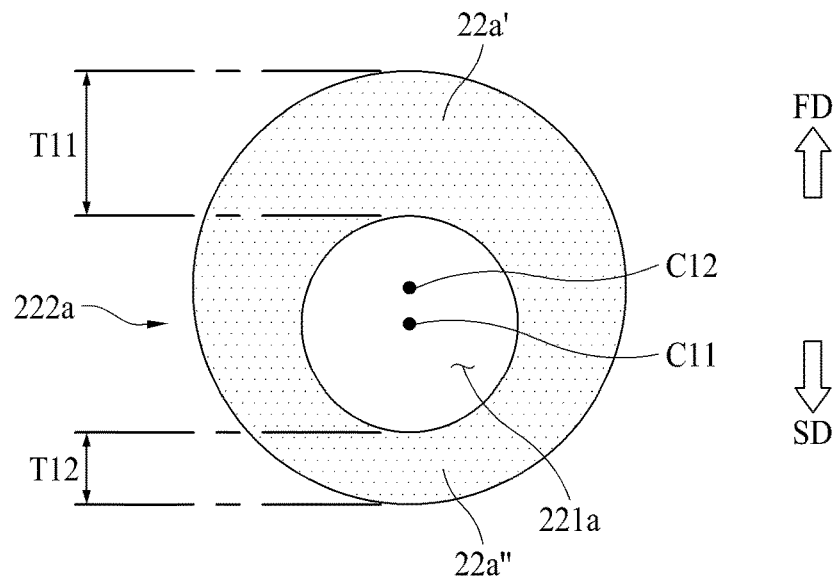
FIG. 6 is a schematic enlarged side sectional view showing the section of a first hollow fiber membrane in the humidifier for fuel cells according to the present disclosure.
Figure 7:
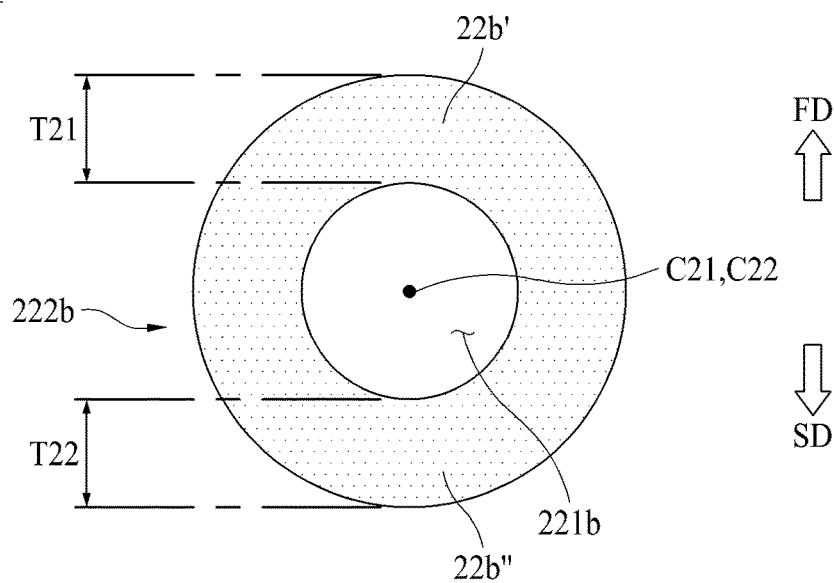
FIG. 7 is a schematic enlarged side sectional view showing the section of a second hollow fiber membrane in the humidifier for fuel cells according to the present disclosure.

Hereinafter, embodiments of a humidifier for fuel cells according to the present disclosure will be described in detail with reference to the accompanying drawings. FIGS. 6 and 7 are side sectional views respectively showing a first hollow fiber membrane and a second hollow fiber membrane, taken along line II-II of FIG. 8. Hollow fiber membranes are omitted from FIGS. 9 and 11, and the hollow fiber membranes may be disposed in parts hatched with dots.

Figure 1:
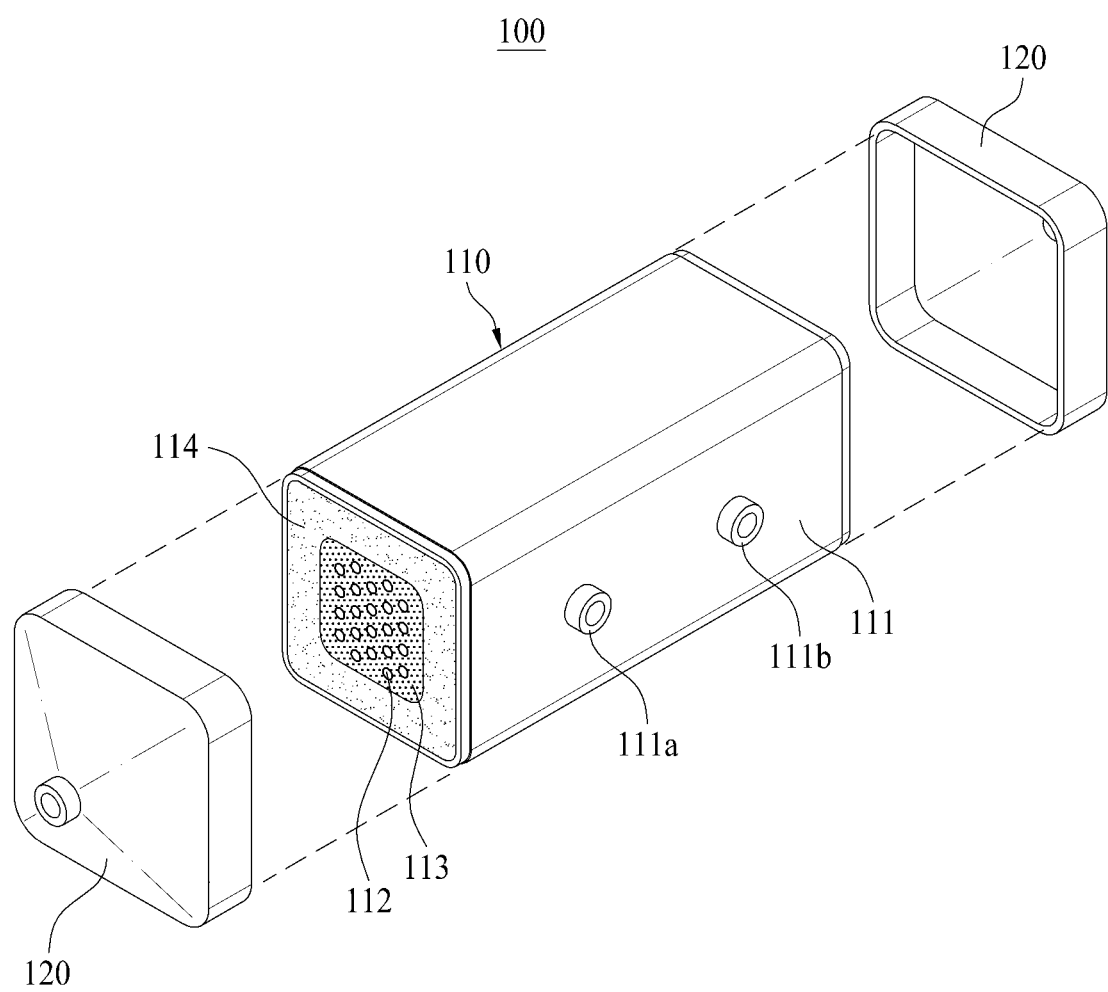
FIG. 1 is a schematic exploded perspective view of a conventional humidifier for fuel cells.
Figure 2:
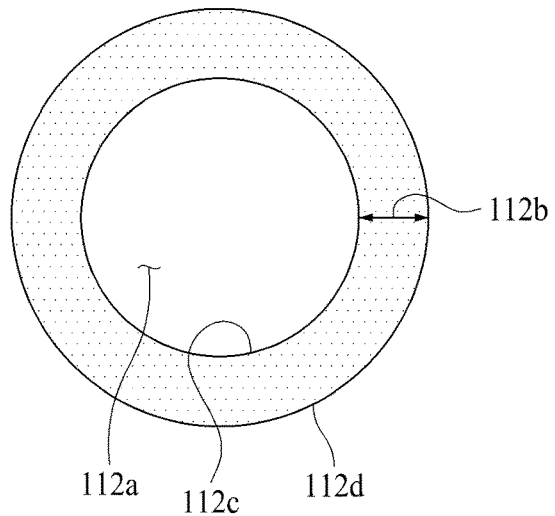
FIG. 2 is a schematic sectional view of a conventional hollow fiber membrane.
Figure 3:
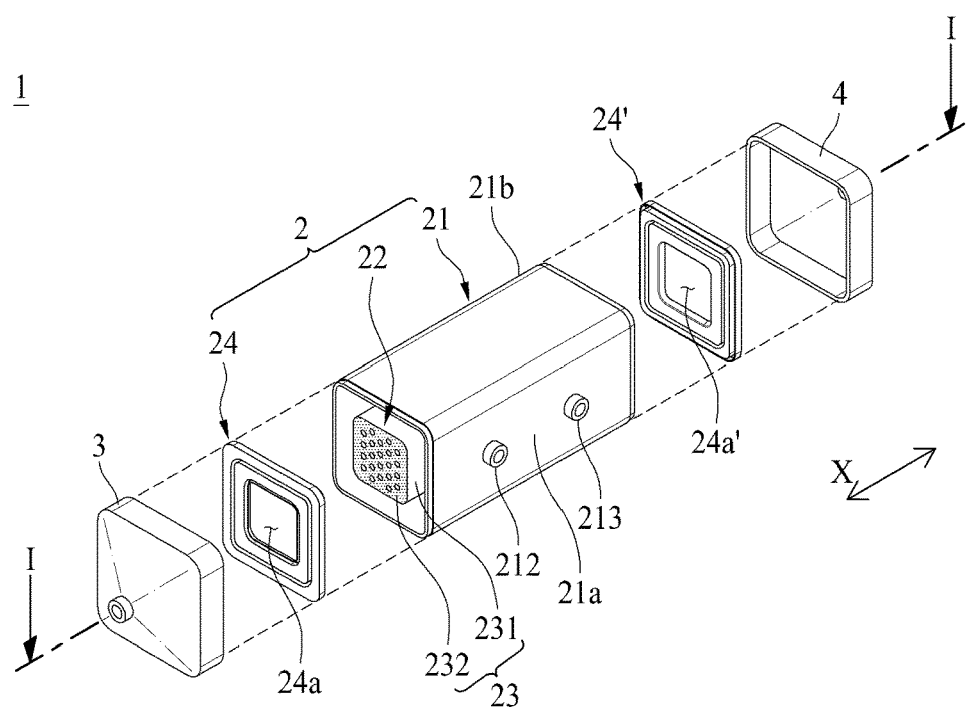
FIG. 3 is a schematic exploded perspective view of a humidifier for fuel cells according to the present disclosure.
Figure 4:
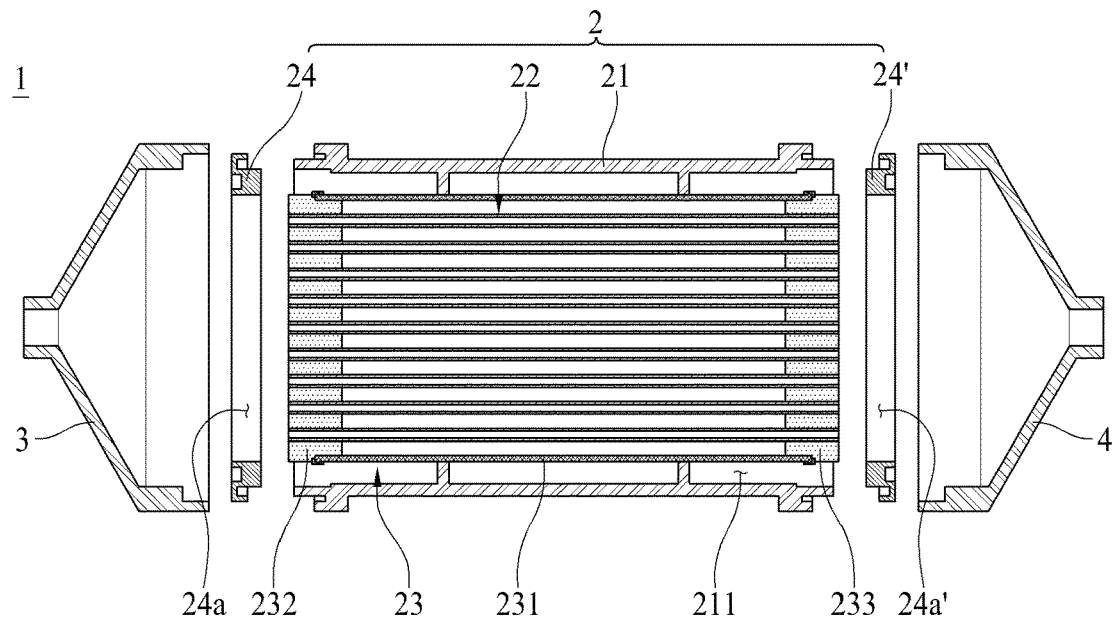
FIG. 4 is a schematic exploded sectional view of the humidifier for fuel cells according to the present disclosure, taken along line I-I of FIG. 3.
Figure 5:
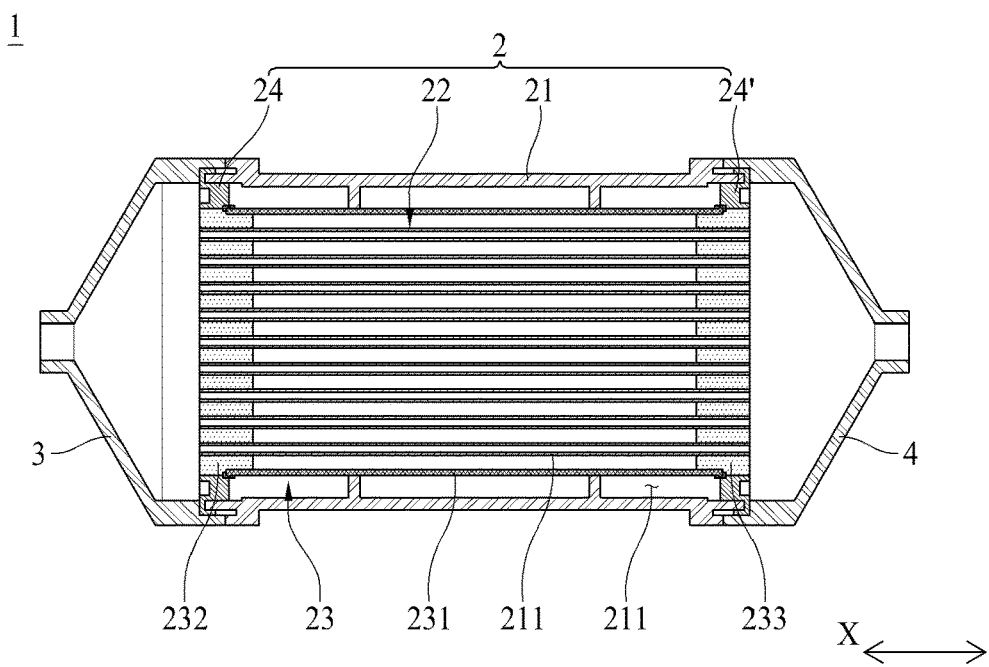
FIG. 5 is a schematic coupled sectional view of the humidifier for fuel cells according to the present disclosure, taken along line I-I of FIG. 3.

Referring to FIGS. 3 to 5, a humidifier 1 for fuel cells according to the present disclosure is configured to humidify dry gas supplied from the outside using wet gas discharged from a fuel cell stack (not shown). The dry gas may be fuel gas or air. The dry gas may be humidified by the wet gas and may then be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 3 to 5, the humidifying module 2 humidifies dry gas supplied from the outside. The first cap 3 may be coupled to one end of the humidifying module 2.

The second cap 4 may be coupled to the other end of the humidifying module 2. The first cap 3 may transmit dry gas to the humidifying module 2. In this case, the second cap 4 may transmit the dry gas humidified by wet gas in the humidifying module 2 to the fuel cell stack. The first cap 3 may transmit wet gas to the humidifying module 2. In this case, the second cap 4 may discharge the wet gas to the outside after dry gas is humidified in the humidifying module 2.

The humidifying module 2 includes a mid-case 21 and a hollow fiber membrane bundle 22.

The mid-case 21 is configured to receive the hollow fiber membrane bundle 22. The hollow fiber membrane bundle 22 may be disposed in the mid-case 21. Opposite ends of the mid-case 21 are open. In this case, a receiving hole 211 may be formed in the mid-case 21. The receiving hole 211 may be formed so as to extend through the mid-case 21 in a first axis direction (X-axis direction). The first axis direction (X-axis direction) is an axial direction parallel to a longitudinal direction of the mid-case 21.

A first gas inlet 212 and a first gas outlet 213 may be formed at one side 21a of the mid-case 21.

The first gas inlet 212 may allow wet gas or dry gas to be introduced into the mid-case 21 therethrough. The first gas outlet 213 may allow wet gas or dry gas to be discharged from the mid-case 21 therethrough. The first gas inlet 212 and the first gas outlet 213 may be disposed spaced apart from each other in the first axis direction (X-axis direction). The first gas inlet 212, the first gas outlet 213, and the mid-case 21 may be integrally formed.

When wet gas flows through the first gas inlet 212 and the first gas outlet 213, the wet gas may be introduced into the mid-case 21 through the first gas inlet 212 and may come into contact with an outer surface of the hollow fiber membrane bundle 22. During this process, moisture contained in the wet gas may be transmitted through the hollow fiber membrane bundle 22, whereby dry gas flowing along hollows of the hollow fiber membrane bundle 22 may be humidified. The humidified dry gas may be discharged from the hollow fiber membrane bundle 22 and may then be supplied to the fuel cell stack. After humidifying the dry gas, the wet gas may be discharged from the mid-case 21 through the first gas outlet 213. The first gas inlet 212 may be connected to the fuel cell stack such that wet gas is supplied thereto. In this case, the wet gas may be off-gas discharged from the fuel cell stack.

When dry gas flows through the first gas inlet 212 and the first gas outlet 213, the dry gas may be introduced into the mid-case 21 through the first gas inlet 212 and may come into contact with the outer surface of the hollow fiber membrane bundle 22. During this process, moisture in wet gas flowing along the hollows of the hollow fiber membrane bundle 22 may be transmitted through the hollow fiber membrane bundle 22, whereby the dry gas introduced into the mid-case 21 may be humidified. The humidified dry gas may be discharged from the mid-case 21 through the first gas outlet 213 and may then be supplied to the fuel cell stack. After humidifying the dry gas, the wet gas may be discharged from the hollow fiber membrane bundle 22 and may then be discharged to the outside through the second cap 4. The first cap 3 may be connected to the fuel cell stack such that wet gas is supplied thereto. In this case, the wet gas may be off-gas discharged from the fuel cell stack.

The hollow fiber membrane bundle 22 is received in the mid-case 21. The hollow fiber membrane bundle 22 may include a plurality of hollow fiber membranes. The hollow fiber membrane bundle 22 may be received in the mid-case 21 in the longitudinal direction thereof.

Referring to FIGS. 3 to 5, the first cap 3 is coupled to one end of the humidifying module 2. A space between the first cap 3 and the humidifying module 2 may be hermetically sealed by a resin layer.

Referring to FIGS. 3 to 5, the second cap 4 is coupled to the other end of the humidifying module 2. The second cap 4 may be coupled to the other end of the humidifying module 2 so as to be spaced apart from the first cap 3 in the first axis direction (X-axis direction). A space between the second cap 4 and the humidifying module 2 may be hermetically sealed by a resin layer.

Here, the humidifier 1 for fuel cells according to the present disclosure may be implemented so as to improve humidification performance through the hollow fiber membrane bundle 22.

Referring to FIGS. 3 to 6, the hollow fiber membrane bundle 22 may include a first hollow fiber membrane 22a.

The first hollow fiber membrane 22a may include a first hollow 221a. The first hollow 221a may be formed so as to extend through the first hollow fiber membrane 22a in a longitudinal direction of the first hollow fiber membrane 22a. The center C11 of the first hollow 221a deviates from the center C12 of the first hollow fiber membrane 22a. As a result, the membrane thickness of the first hollow fiber membrane 22a may be nonuniform in a thickness direction of the first hollow fiber membrane 22a. The membrane thickness of the first hollow fiber membrane 22a may mean the length between an inner surface of the first hollow fiber membrane 22a, which faces the first hollow 221a, and an outer surface of the first hollow fiber membrane 22a. The center C11 of the first hollow 221a may mean the point spaced apart from the entirety of the inner surface of the first hollow fiber membrane 22a by the same distance. The center C12 of the first hollow fiber membrane 22a may mean the point spaced apart from the entirety of the outer surface of the first hollow fiber membrane 22a by the same distance.

Since the center C11 of the first hollow 221a deviates therefrom, whereby the membrane thickness of the first hollow fiber membrane 22a is nonuniform, the first hollow fiber membrane 22a is implemented so as to strengthen durability through a relatively large membrane thickness part thereof and to improve humidification performance through a relatively small membrane thickness part thereof. Consequently, the humidifier 1 for fuel cells according to the present disclosure is implemented so as to secure both humidification performance and durability using the first hollow fiber membrane 22a. The hollow fiber membrane bundle 22 may include a plurality of first hollow fiber membranes 22a. In this case, each of the first hollow fiber membranes 22a may independently include the first hollow 221a. The humidifier 1 for fuel cells according to the present disclosure may be implemented in a structure in which the membrane thicknesses of all of the hollow fiber membranes constituting the hollow fiber membrane bundle 22 are nonuniform, as in the first hollow fiber membrane 22a. The humidifier 1 for fuel cells according to the present disclosure may be implemented in a structure in which the membrane thicknesses of some of the hollow fiber membranes constituting the hollow fiber membrane bundle 22 are nonuniform, as in the first hollow fiber membrane 22a.

The center C11 of the first hollow 221a may deviate from the center C12 of the first hollow fiber membrane 22a toward the other side 21b of the mid-case 21 (shown in FIG. 3). The other side 21b of the mid-case 21 is the side opposite the one side 21a of the mid-case 21. Since the center C11 of the first hollow 221a may deviate from the center C12 of the first hollow fiber membrane 22a toward the other side 21b of the mid-case 21, one side 22a' of the first hollow fiber membrane 22a, which has a relatively large membrane thickness, may be disposed so as to face the one side 21a of the mid-case 21. In this case, the other side 22a" of the first hollow fiber membrane 22a, which has a relatively small membrane thickness, may be disposed so as to face the other side 21b of the mid-case 21. As a result, a thicker part of the first hollow fiber membrane 22a may be disposed at the first gas inlet 212 side. In the humidifier 1 for fuel cells according to the present disclosure, therefore, it is possible to reduce a danger of the first hollow fiber membrane 22a being damaged or broken by the pressure of wet gas or dry gas introduced through the first gas inlet 212. In addition, since the other side 22a" of the first hollow fiber membrane 22a is formed so as to be thinner than the one side 22a' of the first hollow fiber membrane 22a, a thinner part of the first hollow fiber membrane 22a may be disposed inwardly of the mid-case 21. In the humidifier 1 for fuel cells according to the present disclosure, therefore, it is possible to improve humidification performance using wet gas inwardly of the mid-case 21. In this case, the pressure of wet gas or dry gas introduced through the first gas inlet 212 is not directly applied to the other side 22a" side of the first hollow fiber membrane 22a. Consequently, the humidifier 1 for fuel cells according to the present disclosure may be implemented so as to secure both humidification performance and durability using the first hollow fiber membrane 22a. The one side 22a' of the first hollow fiber membrane 22a may be disposed so as to be biased in a first direction (direction indicated by arrow FD), compared to the other side 22a" side of the first hollow fiber membrane 22a. In this case, the center C11 of the first hollow 221a may be disposed spaced apart from the center C12 of the first hollow fiber membrane 22a in a second direction (direction indicated by arrow SD). The second direction (direction indicated by arrow SD) and the first direction (direction indicated by arrow FD) are opposite directions.

The difference between the maximum membrane thickness and the minimum membrane thickness of the first hollow fiber membrane 22a may be 10 μm to 100 μm. The one side 22a' of the first hollow fiber membrane 22a may be a maximum thickness part of the first hollow fiber membrane 22a. The other side 22a" of the first hollow fiber membrane 22a may be a minimum thickness part of the first hollow fiber membrane 22a. In the following description, the maximum thickness part of the first hollow fiber membrane 22a is defined as a first membrane thickness T11 of the first hollow fiber membrane 22a, and the minimum thickness part of the first hollow fiber membrane 22a is defined as a second membrane thickness T12 of the first hollow fiber membrane 22a.

If the difference between the second membrane thickness T12 of the first hollow fiber membrane 22a and the first membrane thickness T11 of the first hollow fiber membrane 22a is less than 10 μm, it is difficult to strengthen durability through the relatively large membrane thickness part and to improve humidification performance through the relatively small membrane thickness part. If the difference between the second membrane thickness T12 of the first hollow fiber membrane 22a and the first membrane thickness T11 of the first hollow fiber membrane 22a exceeds 100 μm, durability of the relatively small membrane thickness part may be excessively weakened, whereby there is a high danger of the relatively small membrane thickness part being damaged or broken. The first hollow fiber membrane 22a may be implemented such that the difference between the second membrane thickness T12 and the first membrane thickness T11 is 10 μm to 100 μm in consideration thereof, whereby it is possible to strengthen durability through the relatively large membrane thickness part and to improve humidification performance through the relatively small membrane thickness part.

The minimum membrane thickness of the first hollow fiber membrane may be implemented to be 60 μm or more. In this case, the second membrane thickness T12 of the first hollow fiber membrane 22a may be implemented to be 60 μm or more. If the second membrane thickness T12 of the first hollow fiber membrane 22a is less than 60 μm, it is possible to further improve humidification performance through the part having the second membrane thickness T12 of the first hollow fiber membrane 22a; however, durability of the part having the second membrane thickness T12 may be excessively weakened, whereby there is a high danger of the part having the second membrane thickness being damaged or broken. The first hollow fiber membrane 22a may be implemented such that the second membrane thickness T12 is 60 μm or more in consideration thereof, whereby it is possible to improve humidification performance through the part having the second membrane thickness T12 and to implement the part having the second membrane thickness T12 so as to exhibit sufficient durability not to be easily damaged or broken.

The first hollow fiber membrane 22a may include a first hollow fiber main body 222a.

The first hollow fiber main body 222a is received in the mid-case 21. The first hollow fiber main body 222a may correspond to a part that defines the overall external appearance of the first hollow fiber membrane 22a. The first hollow fiber main body 222a may be formed in a cylindrical shape having a long length in a longitudinal direction thereof. The longitudinal direction of the first hollow fiber main body 222a may be a direction parallel to the first axis direction (X-axis direction) when the first hollow fiber membrane 22a is received in the mid-case 21.

The first hollow 221a may be formed so as to extend through the first hollow fiber main body 222a in the longitudinal direction of the first hollow fiber main body 222a. Dry gas may be humidified by wet gas outside the first hollow fiber main body 222a while flowing along the first hollow 221a. Wet gas may humidify dry gas outside the first hollow fiber main body 222a while flowing along the first hollow 221a. The first hollow 221a may be formed in a cylindrical shape having a long length in a longitudinal direction thereof. The longitudinal direction of the first hollow 221a may be a direction parallel to the first axis direction (X-axis direction) when the first hollow fiber membrane 22a is received in the mid-case 21.

The center C11 of the first hollow 221a may be spaced apart from the center of the first hollow fiber main body 222a so as to deviate therefrom. The center of the first hollow fiber main body 222a may be located at the same position as the center C12 of the first hollow fiber membrane 22a. Since the first hollow 221a of the first hollow fiber membrane 22a is formed eccentrically, as described above, the membrane thickness thereof may be nonuniform. In the humidifier 1 for fuel cells according to the present disclosure, therefore, the membrane thickness may be nonuniform merely by eccentrically forming the first hollow 221a, whereby it is possible to improve ease in manufacturing the first hollow fiber membrane 22a so as to have a nonuniform membrane thickness.

The center C11 of the first hollow 221a may be disposed spaced apart from the center of the first hollow fiber main body 222a in the second direction (direction indicated by arrow SD). As a result, the first hollow 221a may be formed so as to be eccentric in the second direction (direction indicated by arrow SD). In this case, the first hollow 221a may be formed so as to be eccentric toward the other side 21b of the mid-case 21. Consequently, the one side 22a' of the first hollow fiber membrane 22a, which has the maximum membrane thickness, may be disposed so as to face the one side 21a of the mid-case 21. The other side 22a" of the first hollow fiber membrane 22a, which has the minimum membrane thickness, may be disposed so as to face the other side 21b of the mid-case 21.

Referring to FIGS. 3 to 7, the hollow fiber membrane bundle 22 may include a second hollow fiber membrane 22b.

The second hollow fiber membrane 22b may include a second hollow 221b. The second hollow 221b may be formed so as to extend through the second hollow fiber membrane 22b in a longitudinal direction of the second hollow fiber membrane 22b. The center C21 of the second hollow 221b may be located at the same position as the center C22 of the second hollow fiber membrane 22b. As a result, the membrane thickness of the second hollow fiber membrane 22b may be uniform in a thickness direction of the second hollow fiber membrane 22b. The membrane thickness of the second hollow fiber membrane 22b may mean the length between an inner surface of the second hollow fiber membrane 22b, which faces the second hollow 221b, and an outer surface of the second hollow fiber membrane 22b. Since the membrane thickness of the second hollow fiber membrane 22b is uniform, the second hollow fiber membrane 22b is implemented so as to exhibit overall uniform durability and uniform humidification performance. The center C21 of the second hollow 221b may mean the point spaced apart from the entirety of the inner surface of the second hollow fiber membrane 22b by the same distance. The center C22 of the second hollow fiber membrane 22b may mean the point spaced apart from the entirety of the outer surface of the second hollow fiber membrane 22b by the same distance. The hollow fiber membrane bundle 22 may include a plurality of second hollow fiber membranes 22b. In this case, each of the second hollow fiber membranes 22b may independently include the second hollow 221b.

The second hollow fiber membrane 22b may be disposed closer to the one side 21a of the mid-case 21 than the first hollow fiber membrane 22a. As a result, the second hollow fiber membrane 22b may be disposed closer to the first gas inlet 212 than the first hollow fiber membrane 22a. In this case, the second hollow fiber membrane 22b may be disposed between the first hollow fiber membrane 22a and the first gas inlet 212. Consequently, the humidifier 1 for fuel cells according to the present disclosure may achieve the following operation and effects.

First, when all of the hollow fiber membranes constituting the hollow fiber membrane bundle 22 are implemented in a structure in which the membrane thickness of each thereof is nonuniform, as in the first hollow fiber membrane 22a, the relatively large membrane thickness parts of the first hollow fiber membranes 22a must be disposed in a region adjacent to the first gas inlet 212 so as to face the first gas inlet 212. The reason for this is that, if the relatively small membrane thickness parts are disposed so as to face the first gas inlet 212, there is a high danger of the first hollow fiber membranes 22a being damaged or broken by the pressure of wet gas or dry gas introduced through the first gas inlet 212. In the region adjacent to the first gas inlet 212, therefore, the disposition directions of the first hollow fiber membranes 22a must be accurately aligned, whereby time necessary to receive the hollow fiber membrane bundle 22 in the mid-case 21 may be increased.

Next, when some of the hollow fiber membranes constituting the hollow fiber membrane bundle 22 are implemented in a structure in which the membrane thickness of each thereof is nonuniform, as in the first hollow fiber membrane 22a, and some of the hollow fiber membranes constituting the hollow fiber membrane bundle are implemented in a structure in which the membrane thickness of each thereof is uniform, as in the second hollow fiber membrane 22b, the second hollow fiber membranes 22b may be disposed in the region adjacent to the first gas inlet 212, and the first hollow fiber membranes 22a may be disposed in a region spaced apart from the first gas inlet 212. As a result, the second hollow fiber membranes 22b may be implemented so as to exhibit overall uniform durability, and therefore the second hollow fiber membranes may be received in the mid-case 21 irrespective of the disposition directions thereof. In addition, since the first hollow fiber membranes 22a are disposed in the region spaced apart from the first gas inlet 212, the first hollow fiber membranes are not directly affected by the pressure of wet gas or dry gas introduced through the first gas inlet 212. As a result, the first hollow fiber membranes 22a may also be received in the mid-case 21 irrespective of the disposition directions thereof. Consequently, it is not necessary to accurately align the disposition directions of all of the second hollow fiber membranes 22b and the first hollow fiber membranes 22a, whereby it is possible to reduce time necessary to receive the hollow fiber membrane bundle 22 in the mid-case 21 and to improve ease in receiving the hollow fiber membrane bundle 22 in the mid-case 21.

One side 22b' of the second hollow fiber membrane 22b may be disposed so as to face the first gas inlet 212. The one side 22b' of the second hollow fiber membrane 22b may be defined as a first membrane thickness T21 (shown in FIG. 7). The first membrane thickness T21 of the second hollow fiber membrane 22b may mean the length between an inner surface and an outer surface of the second hollow fiber membrane 22b at the one side 22b' thereof. The other side 22b" of the second hollow fiber membrane 22b may be defined as a second membrane thickness T22 (shown in FIG. 7). The second membrane thickness T22 of the second hollow fiber membrane 22b may mean the length between the inner surface and the outer surface of the second hollow fiber membrane 22b at the other side 22b" thereof. The other side 22b" of the second hollow fiber membrane 22b and the one side 22b' of the second hollow fiber membrane 22b may be disposed at opposite sides. The first membrane thickness T21 of the second hollow fiber membrane 22b and the second membrane thickness T22 of the second hollow fiber membrane 22b may be equal to each other.

The second hollow fiber membrane 22b may include a second hollow fiber main body 222b.

The second hollow fiber main body 222b is received in the mid-case 21. The second hollow fiber main body 222b may correspond to a part that defines the overall external appearance of the second hollow fiber membrane 22b. The second hollow fiber main body 222b may be formed in a cylindrical shape having a long length in a longitudinal direction thereof. The longitudinal direction of the second hollow fiber main body 222b may be a direction parallel to the first axis direction (X-axis direction) when the second hollow fiber membrane 22b is received in the mid-case 21.

The second hollow 221b may be formed so as to extend through the second hollow fiber main body 222b in the longitudinal direction of the second hollow fiber main body 222b. Dry gas may be humidified by wet gas outside the second hollow fiber main body 222b while flowing along the second hollow 221b. Wet gas may humidify dry gas outside the second hollow fiber main body 222b while flowing along the second hollow 221b. The second hollow 221b may be formed in a cylindrical shape having a long length in a longitudinal direction thereof. The longitudinal direction of the second hollow 221b may be a direction parallel to the first axis direction (X-axis direction) when the second hollow fiber membrane 22b is received in the mid-case 21.

The center C21 of the second hollow 221b and the center of the second hollow fiber main body 222b may be located at the same position. The center of the second hollow fiber main body 222b may mean the point spaced apart from the entirety of the outer surface of the second hollow fiber membrane 22b by the same distance. Since the center C21 of the second hollow 221b and the center of the second hollow fiber main body 222b are located at the same position, as described above, the membrane thickness of the second hollow fiber membrane 22b may be uniform.

Here, the hollow fiber membrane bundle 22 may be directly received in the mid-case 21, or may be received in the mid-case 21 through at least one cartridge 23 included in the humidifying module 2.

Referring to FIGS. 3 to 9, the cartridge 23 may be disposed in the mid-case 21. The hollow fiber membrane bundle 22 may be coupled to the cartridge 23 so as to be modularized. Consequently, the hollow fiber membrane bundle 22 may be received in the mid-case 21 through a process of coupling the cartridge 23 to the mid-case 21. In the humidifier 1 for fuel cells according to the present disclosure, therefore, ease in installation, separation, and replacement of the hollow fiber membrane bundle 22 may be improved.

The cartridge 23 may include an inner case 231.

The inner case 231 has openings formed in ends thereof, and the hollow fiber membrane bundle 22 is received in the inner case. The hollow fiber membrane bundle 22 may be disposed in the inner case 231 so as to be modularized. The hollow fiber membrane bundle 22 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include fixing layers 232 and 233.

Ends of the hollow fiber membrane bundle 22 are potted in the fixing layers 232 and 233, which close the openings of the inner case 231. One end of the hollow fiber membrane bundle 22 may be fixed by the fixing layer 232, and the other end of the hollow fiber membrane bundle 22 may be fixed by the fixing layer 233. The one end of the hollow fiber membrane bundle 22 and the other end of the hollow fiber membrane bundle 22 mean ends disposed at opposite sides in the first axis direction (X-axis direction). Each of the fixing layers 232 and 233 may be formed by hardening a liquid resin, such as liquid polyurethane resin, through a casting process. The fixing layers 232 and 233 may fix the ends of the hollow fiber membrane bundle 22 to the inner case 231.

The fixing layers 232 and 233 may be formed so as not to block the hollows of the hollow fiber membrane bundle 22. Consequently, dry gas or wet gas supplied from the outside may be supplied to the hollows of the hollow fiber membrane bundle 22 without being disturbed by the fixing layers 232 and 233

The cartridge 23 may include a second gas inlet 234 and a second gas outlet 235.

Figure 8:
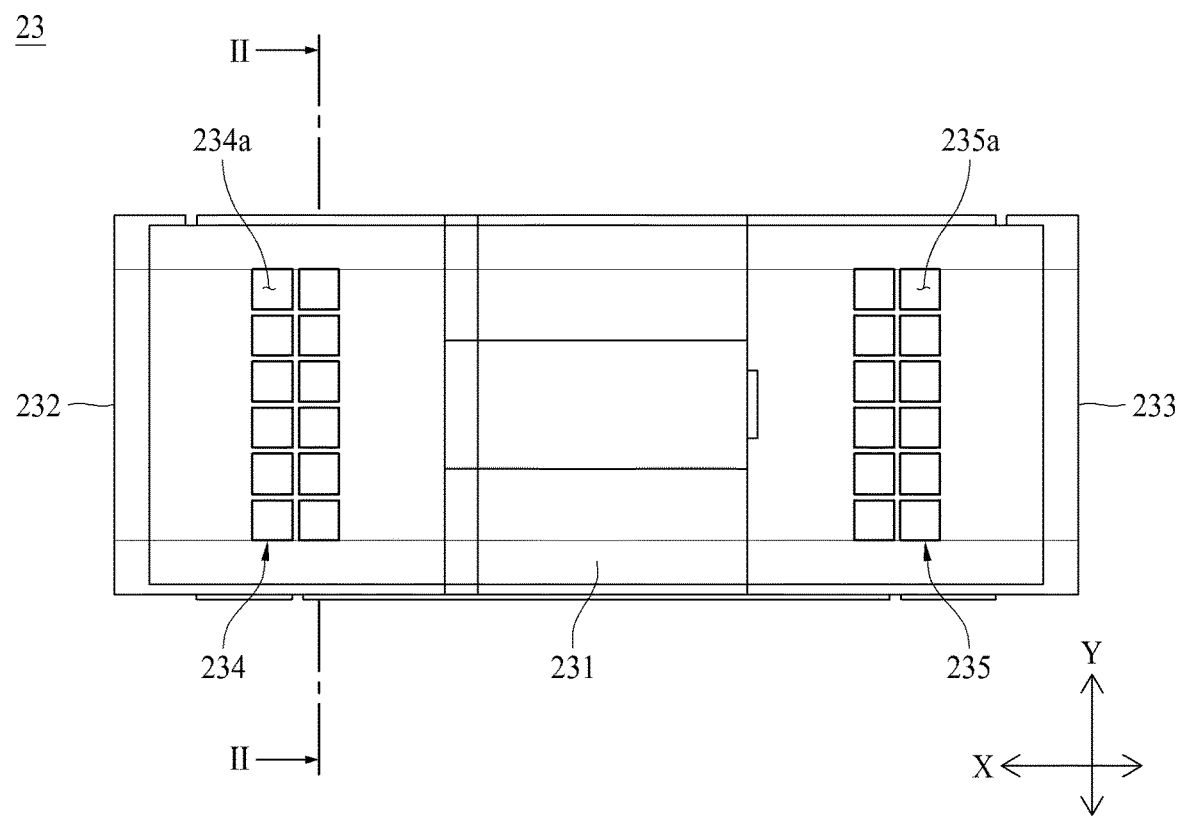
FIG. 8 is a schematic plan view of a cartridge in the humidifier for fuel cells according to the present disclosure.

The second gas inlet 234 is formed in the inner case 231. The second gas inlet 234 may be formed at one side of the inner case 231. The one side of the inner case 231 and the one side 21a of the mid-case 21 may be disposed so as to face in different directions. The one side of the inner case 231 and the one side 21a of the mid-case 21 may be disposed so as to face in the same direction. The second gas inlet 234 may allow wet gas or dry gas to be introduced into the inner case 231 therethrough. The second gas inlet 234 may be formed through the inner case 231. As shown in FIG. 8, the second gas inlet 234 may be implemented by a plurality of through-holes formed through the inner case 231. In this case, the second gas inlet 234 may include a plurality of windows 234a formed through different parts of the inner case 231. The windows 234a may be disposed spaced apart from each other in the first axis direction (X-axis direction) and a second axis direction (Y-axis direction) so as to form a matrix. The second axis direction (Y-axis direction) is an axial direction perpendicular to the first axis direction (X-axis direction). Although not shown, the second gas inlet 234 may be implemented by a single through-hole formed through the inner case 231.

The second gas outlet 235 is formed in the inner case 231. The second gas outlet 235 may be formed at one side of the inner case 231. The second gas outlet 235 may allow wet gas or dry gas to be discharged from the inner case 231 therethrough. The second gas outlet 235 may be formed through the inner case 231. As shown in FIG. 8, the second gas outlet 235 may be implemented by a plurality of through-holes formed through the inner case 231. In this case, the second gas outlet 235 may include a plurality of windows 235a formed through different parts of the inner case 231. The windows 235a may be disposed spaced apart from each other in the first axis direction (X-axis direction) and the second axis direction (Y-axis direction) so as to form a matrix. Although not shown, the second gas outlet 235 may be implemented by a single through-hole formed through the inner case 231.

The second gas outlet 235 and the second gas inlet 234 may be disposed spaced apart from each other in the first axis direction (X-axis direction). Consequently, wet gas may be supplied to a space between an inner surface of the mid-case 21 and an outer surface of the cartridge 23 through the first gas inlet 212, may be supplied into the inner case 231 through the second gas inlet 234, may come into contact with the outer surface of the hollow fiber membrane bundle 22, may humidify dry gas flowing along the hollows of the hollow fiber membrane bundle 22, may be discharged to the space between the inner surface of the mid-case 21 and the outer surface of the cartridge 23 through the second gas outlet 235, and may be discharged from the mid-case 21 through the first gas outlet 213. Meanwhile, dry gas may be supplied to the space between the inner surface of the mid-case 21 and the outer surface of the cartridge 23 through the first gas inlet 212, may be supplied into the inner case 231 through the second gas inlet 234, may come into contact with the outer surface of the hollow fiber membrane bundle 22, may be humidified by wet gas flowing along the hollows of the hollow fiber membrane bundle 22, may be discharged to the space between the inner surface of the mid-case 21 and the outer surface of the cartridge 23 through the second gas outlet 235, and may be discharged from the mid-case 21 through the first gas outlet 213.

The humidifying module 2 may include a plurality of packing members 24 and 24'.

The packing members 24 and 24' hermetically seal between the cartridge 23 and the mid-case 21 in order to prevent direct mixing between dry gas and wet gas. The packing members 24 and 24' may be inserted between the cartridge 23 and the mid-case 21. In this case, the cartridge 23 may be inserted through through-holes 24a and 24a' formed in the packing members 24 and 24'. The packing members 24 and 24' may be disposed respectively at opposite ends of the cartridge 23 in the first axis direction (X-axis direction). Although not shown, resin layers may be formed respectively at opposite sides of the cartridge 23 instead of the packing members 24 and 24'. Each of the resin layers may be formed by hardening a liquid polymer, such as liquid polyurethane resin, using a casting method. A space between the first cap 3 and the cartridge 23 may be isolated from a space between the cartridge 23 and the mid-case 21 in a hermetically sealed state by the packing member 24 or the resin layer. A space between the second cap 4 and the cartridge 23 may be isolated from the space between the cartridge 23 and the mid-case 21 in a hermetically sealed state by the packing member 24' or the resin layer.

Here, the first hollow fiber membrane 22a may be disposed in the inner case 231. The center C11 of the first hollow 221a may deviate from the center C12 of the first hollow fiber membrane 22a toward the other side of the inner case 231. In this case, the one side 22a' of the first hollow fiber membrane 22a may be disposed so as to face the one side of the inner case 231. Consequently, the relatively large membrane thickness part of the first hollow fiber membranes 22a may be disposed so as to face the one side of the inner case 231, and the relatively small membrane thickness part of the first hollow fiber membranes may be disposed so as to face the other side of the inner case 231. A plurality of first hollow fiber membranes 22a may be disposed in the inner case 231.

Here, the second hollow fiber membrane 22b may be disposed in the inner case 231. The center C21 of the second hollow 221b may be located at the same position as the center C22 of the second hollow fiber membrane 22b. A plurality of second hollow fiber membranes 22b may be disposed in the inner case 231.

The second hollow fiber membrane 22b may be disposed closer to the one side of the inner case 231 than the first hollow fiber membrane 22a. As a result, the second hollow fiber membrane 22b may be disposed closer to the second gas inlet 234 than the first hollow fiber membrane 22a. In this case, the second hollow fiber membrane 22b may be disposed so as to be biased in the first direction (direction indicated by arrow FD), compared to the first hollow fiber membrane 22a, and the first hollow fiber membrane 22a may be disposed so as to be biased in the second direction (direction indicated by arrow SD), compared to the second hollow fiber membrane 22b. Consequently, the humidifier 1 for fuel cells according to the present disclosure may achieve the following operation and effects.

First, when all of the hollow fiber membranes constituting the hollow fiber membrane bundle 22 are implemented in a structure in which the membrane thickness of each thereof is nonuniform, as in the first hollow fiber membrane 22a, the relatively large membrane thickness part of each of the first hollow fiber membranes 22a must be disposed in a first region 231a (shown in FIG. 9) adjacent to the second gas inlet 234 so as to face the second gas inlet 234. The reason for this is that, if the relatively small membrane thickness part is disposed so as to face the second gas inlet 234, there is a high danger of the first hollow fiber membranes 22a being damaged or broken by the pressure of wet gas or dry gas introduced through the second gas inlet 234. In the first region 231a adjacent to the second gas inlet 234, therefore, the disposition directions of the first hollow fiber membranes 22a must be accurately aligned, whereby time necessary to dispose the hollow fiber membrane bundle 22 in the inner case 231 may be increased.

Next, when some of the hollow fiber membranes constituting the hollow fiber membrane bundle 22 are implemented in a structure in which the membrane thickness of each thereof is nonuniform, as in the first hollow fiber membrane 22a, and some of the hollow fiber membranes constituting the hollow fiber membrane bundle 22 are implemented in a structure in which the membrane thickness of each thereof is uniform, as in the second hollow fiber membrane 22b, the second hollow fiber membranes 22b may be disposed in the first region 231a adjacent to the second gas inlet 234, and the first hollow fiber membranes 22a may be disposed in a second region 231b (shown in FIG. 9) spaced apart from the second gas inlet 234. As a result, the second hollow fiber membranes 22b may be implemented so as to exhibit overall uniform durability, and therefore the second hollow fiber membranes may be coupled to the interior of the inner case 231 irrespective of the disposition directions thereof. In addition, since the first hollow fiber membranes 22a are disposed in the second region 231b spaced apart from the second gas inlet 234, the first hollow fiber membranes are not directly affected by the pressure of wet gas or dry gas introduced through the second gas inlet 234. As a result, the first hollow fiber membranes 22a may also be disposed in the inner case 231 irrespective of the disposition directions thereof. Consequently, it is not necessary to accurately align the disposition directions of all of the second hollow fiber membranes 22b and the first hollow fiber membranes 22a, whereby it is possible to reduce time necessary to dispose the hollow fiber membrane bundle 22 in the inner case 231 and to improve ease in disposing the hollow fiber membrane bundle 22 in the inner case 231.

Figure 9:
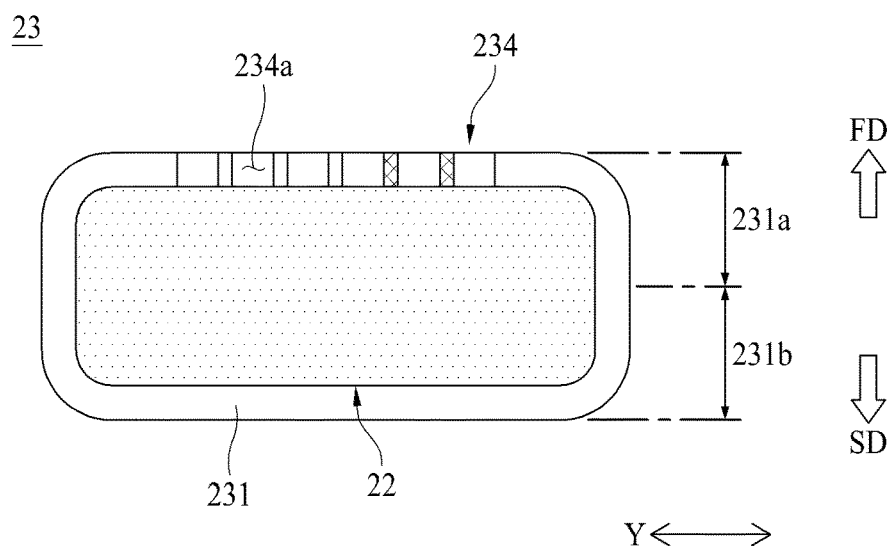
FIG. 9 is a schematic side sectional view of the cartridge in the humidifier for fuel cells according to the present disclosure, taken along line II-II of FIG. 8.

FIG. 9 shows that the first region 231a and the second region 231b are implemented to have almost the same size; however, the present disclosure is not limited thereto, and the first region 231a and the second region 231b may be implemented to have different sizes. For example, when the pressure of wet gas or dry gas introduced through the second gas inlet 234 is high, the first region 231a may be implemented to have a larger size than the second region 231b. In the humidifier 1 for fuel cells according to the present disclosure, therefore, the number of the second hollow fiber membranes 22b disposed in the first region 231a is increased, whereby damage to or breakage of the hollow fiber membrane bundle 22 due to the pressure of wet gas or dry gas introduced through the second gas inlet 234 is reduced. For example, when the pressure of wet gas or dry gas introduced through the second gas inlet 234 is low, the first region 231a may be implemented to have a smaller size than the second region 231b. In the humidifier 1 for fuel cells according to the present disclosure, therefore, the number of the second hollow fiber membranes 22b disposed in the first region 231a may be decreased, and at the same time the number of the first hollow fiber membranes 22a disposed in the second region 231b may be increased, whereby damage to or breakage of the hollow fiber membrane bundle 22 due to the pressure of wet gas or dry gas introduced through the second gas inlet 234 may be reduced, and humidification performance may be improved.

Referring to FIGS. 3 to 12, the cartridge 23 may include a third gas inlet 236 and a third gas outlet 237.

Figure 10:
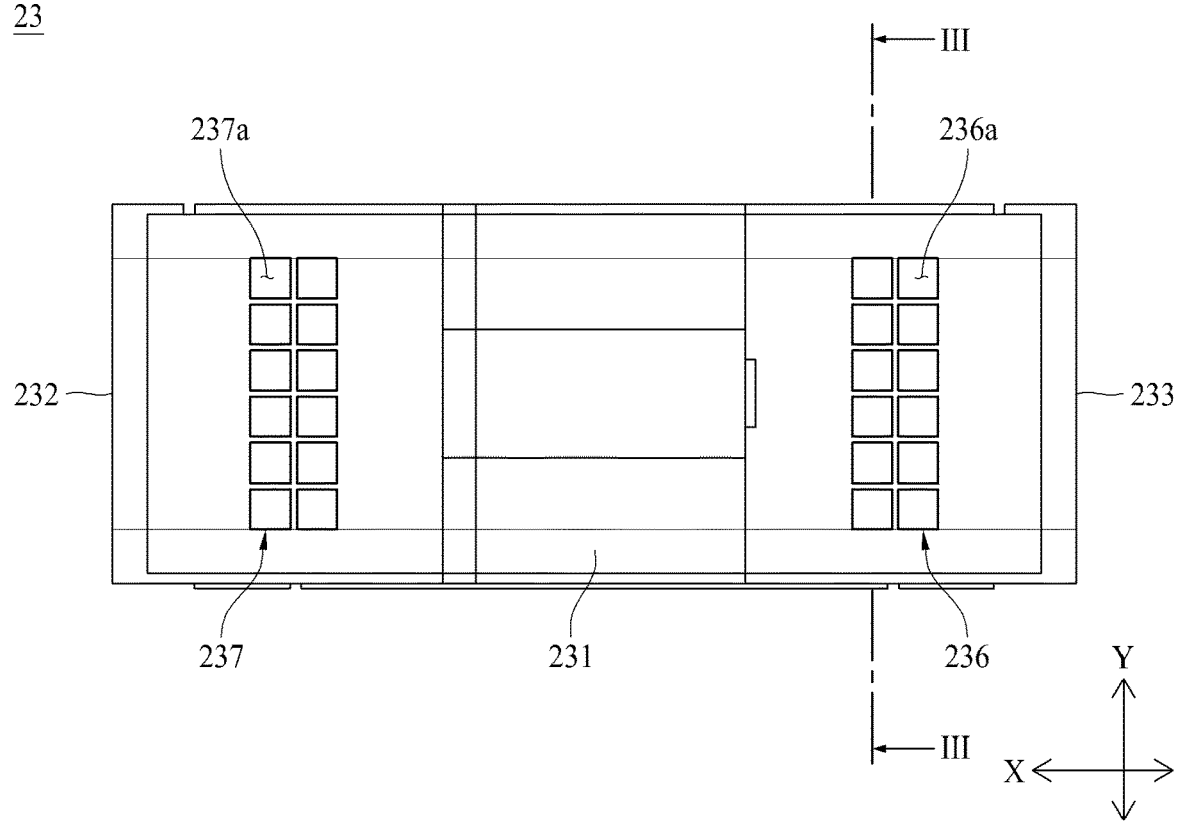
FIG. 10 is a schematic bottom view of the cartridge in the humidifier for fuel cells according to the present disclosure.

The third gas inlet 236 is formed in the inner case 231. The third gas inlet 236 may be formed at the other side of the inner case 231. The third gas inlet 236 and the second gas outlet 235 may be disposed so as to face each other. The third gas inlet 236 may allow wet gas or dry gas to be introduced into the inner case 231 therethrough. The third gas inlet 236 may be formed through the inner case 231. As shown in FIG. 10, the third gas inlet 236 may be implemented by a plurality of through-holes formed through the inner case 231. In this case, the third gas inlet 236 may include a plurality of windows 236*a* formed through different parts of the inner case 231. The windows 236*a* may be disposed spaced apart from each other in the first axis direction (X-axis direction) and a second axis direction (Y-axis direction) so as to form a matrix. The second axis direction (Y-axis direction) is an axial direction perpendicular to the first axis direction (X-axis direction). Although not shown, the third gas inlet 236 may be implemented by a single through-hole formed through the inner case 231.

The third gas outlet 237 is formed in the inner case 231. The third gas outlet 237 may be formed at the other side of the inner case 231. The third gas inlet 237 and the second gas inlet 234 may be disposed so as to face each other. The third gas outlet 237 may allow wet gas or dry gas to be discharged from the inner case 231 therethrough. The third gas outlet 237 may be formed through the inner case 231. As shown in FIG. 10, the third gas outlet 237 may be implemented by a plurality of through-holes formed through the inner case 231. In this case, the third gas outlet 237 may include a plurality of windows 237*a* formed through different parts of the inner case 231. The windows 237*a* may be disposed spaced apart from each other in the first axis direction (X-axis direction) and the second axis direction (Y-axis direction) so as to form a matrix. Although not shown, the third gas outlet 237 may be implemented by a single through-hole formed through the inner case 231. The third gas outlet 237 and the third gas inlet 236 may be disposed spaced apart from each other in the first axis direction (X-axis direction).

Figure 11:
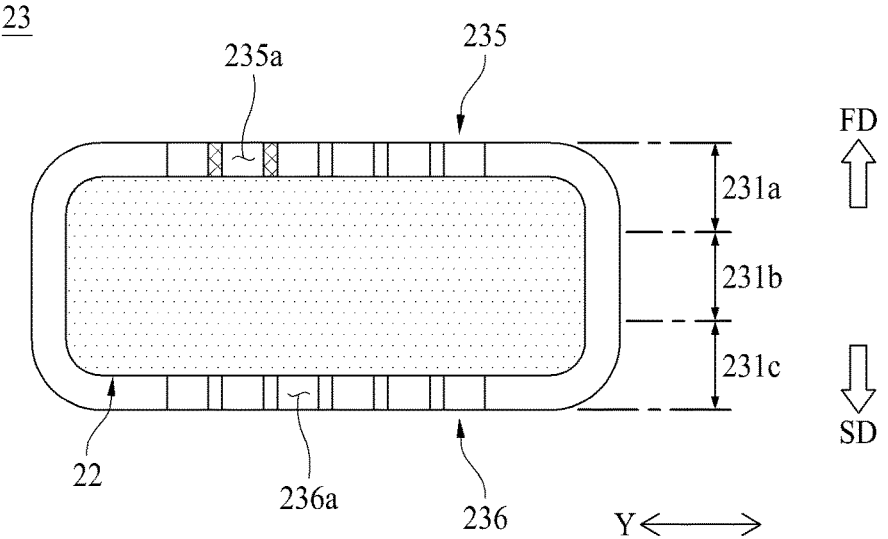
FIG. 11 is a schematic side sectional view of the cartridge in the humidifier for fuel cells according to the present disclosure, taken along line III-III of FIG. 10.

The second hollow fiber membrane 22*b* may be disposed closer to the one side and the other side of the inner case 231 than the first hollow fiber membrane 22*a*. Consequently, the second hollow fiber membrane 22*b* may be disposed closer to the second gas inlet 234 and the third gas inlet 236 than the first hollow fiber membrane 22*a*. In this case, the first hollow fiber membrane 22*a* may be disposed between the second hollow fiber membrane 22*b* disposed adjacent to the one side of the inner case 231 and the second hollow fiber membrane 22*b* disposed adjacent to the other side of the inner case 231. As a result, the second hollow fiber membranes 22*b* may be disposed in each of the first region 231*a* adjacent to the second gas inlet 234 and a third region 231*c* (shown in FIG. 11) adjacent to the third gas inlet 236, and the first hollow fiber membranes 22*a* may be disposed in the second region 231*b* spaced apart from each of the second gas inlet 234 and the third gas inlet 236. As a result, the first hollow fiber membranes 22*a* may be disposed at positions at which the first hollow fiber membranes are not directly affected by the pressure of wet gas or dry gas introduced through each of the second gas inlet 234 and the third gas inlet 236. Consequently, the humidifier 1 for fuel cells according to the present disclosure may be implemented so as to reduce damage to or breakage of the hollow fiber membrane bundle 22 due to the pressure of wet gas or dry gas introduced through each of the second gas inlet 234 and the third gas inlet 236 and to exhibit improved humidification performance. FIG. 11 shows that the first region 231*a*, the second region 231*b*, and the third region 231*c* are implemented to have almost the same size; however, the present disclosure is not limited thereto, and the second region 231*b* may be implemented to have a size different from each of the size of the first region 231*a* and the size of the third region 231*c*.

Figure 12:
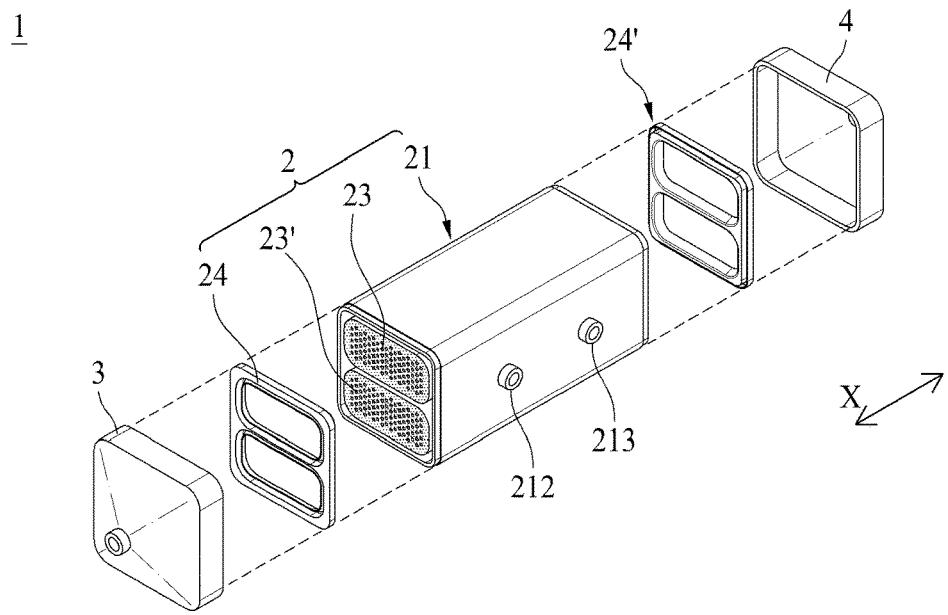
FIG. 12 is a schematic exploded perspective view showing an embodiment in which two cartridges are coupled to a mid-case in the humidifier for fuel cells according to the present disclosure.
Figure 13:
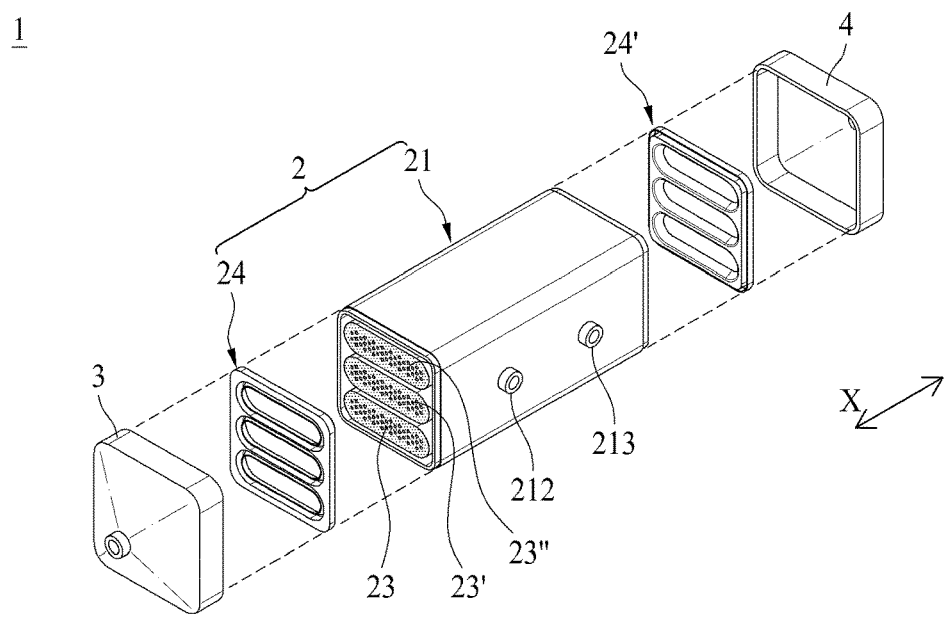
FIG. 13 is a schematic exploded perspective view showing an embodiment in which three cartridges are coupled to the mid-case in the humidifier for fuel cells according to the present disclosure.

Referring to FIGS. 12 and 13, in the humidifier 1 for fuel cells according to the present disclosure, two or more cartridges 23 may be disposed in the mid-case 21. As shown in FIG. 12, two cartridges 23 and 23' may be disposed in the mid-case 21. As shown in FIG. 13, three cartridges 23, 23', and 23" may be disposed in the mid-case 21. Although not shown, four or more cartridges 23 may be disposed in the mid-case 21.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein
the humidifying module comprises:
a mid-case open at opposite ends thereof;
a first gas inlet and a first gas outlet formed at one side of the mid-case; and
a hollow fiber membrane bundle received in the mid-case in a longitudinal direction,
the hollow fiber membrane bundle comprises a plurality of first hollow fiber membranes,
each of the first hollow fiber membranes independently comprises a first hollow, and
a center of the first hollow deviates from a center of the first hollow fiber membrane toward the other side of the mid-case,
wherein the hollow fiber membrane bundle further comprises a plurality of second hollow fiber membranes,
each of the second hollow fiber membranes independently comprises a second hollow, and
a center of the second hollow is located at an identical position to a center of the second hollow fiber membrane.

2. The humidifier according to claim 1, wherein a difference between a maximum membrane thickness and a minimum membrane thickness of the first hollow fiber membrane is 10 μm to 100 μm.

3. The humidifier according to claim 1, wherein the first hollow fiber membrane has a minimum membrane thickness of 60 μm or more.

4. The humidifier according to claim 1, wherein the second hollow fiber membrane is disposed closer to the one side of the mid-case than the first hollow fiber membrane.

5. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein
the humidifying module comprises:
a mid-case open at opposite ends thereof;
a first gas inlet and a first gas outlet formed at one side of the mid-case; and
at least one cartridge disposed in the mid-case,
the cartridge comprises an inner case having an opening formed at each end thereof, a hollow fiber membrane bundle being received in the inner case,
the inner case is provided at one side thereof with a second gas inlet and a second gas outlet,
the hollow fiber membrane bundle comprises a plurality of first hollow fiber membranes,
each of the first hollow fiber membranes independently comprises a first hollow, and
a center of the first hollow deviates from a center of the first hollow fiber membrane toward the other side of the inner case,
wherein the hollow fiber membrane bundle further comprises a plurality of second hollow fiber membranes,
each of the second hollow fiber membranes independently comprises a second hollow, and
a center of the second hollow is located at an identical position to a center of the second hollow fiber membrane.

6. The humidifier according to claim 5, wherein a difference between a maximum membrane thickness and a minimum membrane thickness of the first hollow fiber membrane is 10 µm to 100 µm.

7. The humidifier according to claim 5, wherein the first hollow fiber membrane has a minimum membrane thickness of 60 µm or more.

8. The humidifier according to claim 5, wherein the second hollow fiber membrane is disposed closer to the one side of the inner case than the first hollow fiber membrane.

9. The humidifier according to claim 5, wherein
the inner case is provided at the other side thereof with a third gas inlet and a third gas outlet, and
the second hollow fiber membrane is disposed closer to the one side and the other side of the inner case than the first hollow fiber membrane.

10. The humidifier according to claim 5, wherein two or more cartridges are disposed in the mid-case.

* * * * *